United States Patent [19] [11] 4,377,682
Ohguchi et al. [45] Mar. 22, 1983

[54] COPOLYESTERS

[75] Inventors: Masakatsu Ohguchi; Tatsuhiko Shizuki; Takao Kashihara, all of Ootsu, Japan

[73] Assignee: Toyo Boseki Kabushiki Kaisha, Osaka, Japan

[21] Appl. No.: 307,362

[22] Filed: Sep. 30, 1981

[30] Foreign Application Priority Data

Oct. 2, 1980 [JP] Japan .................. 55-138574

[51] Int. Cl.³ .......................... C08G 63/66
[52] U.S. Cl. .................. 528/301; 528/176; 528/297; 528/302; 528/308.1; 528/308.6; 528/308.7
[58] Field of Search ............. 528/176, 295, 297, 301, 528/302, 309

[56] References Cited

U.S. PATENT DOCUMENTS

| | | | |
|---|---|---|---|
| 3,657,193 | 4/1972 | Caldwell | 528/295 |
| 3,725,348 | 4/1973 | Harrison et al. | 528/295 X |
| 3,779,993 | 12/1973 | Kibler et al. | 528/295 |
| 3,900,527 | 8/1975 | King et al. | 528/295 |
| 3,932,326 | 1/1976 | Holt et al. | 528/309 X |
| 4,156,774 | 5/1979 | Buxbaum et al. | 528/309 X |
| 4,259,478 | 3/1981 | Jackson et al. | 528/309 X |

FOREIGN PATENT DOCUMENTS 977104 12/1964 United Kingdom.
1056118 1/1967 United Kingdom.
1071544 6/1967 United Kingdom.

Primary Examiner—Lucille M. Phynes
Attorney, Agent, or Firm—Wenderoth, Lind & Ponack

[57] ABSTRACT

Copolyesters of improved dyeability are formed from dicarboxylic acid components and glycol components. The new polyesters are characterized in that more than 80 mol percent of the dicarboxylic acids is terephthalic acid or its ester-forming derivative and that more than 80 mol percent of the glycols is a glycol or two or more glycols selected from ethylene glycol, tetramethylene glycol and 1,4-cyclohexane dimethanol and 1 to 10 weight percent thereof, based on the resulting polyester is a glycol represented by the following formula (I):

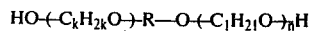

wherein R is a divalent aliphatic hydrocarbon group having 4 to 20 carbon atoms, K and l are same or different integers of 2 to 4, m and n are same or different integers, and $1 \leq m+n \leq 10$.

5 Claims, No Drawings

COPOLYESTERS

The present invention relates to copolyesters improved in dyeability and the dyed articles of which are excellent in light-resistance.

Since aromatic polyesters represented by polyethylene terephthalate are excellent in mechanical properties, resistance to light, resistance to heat and resistance to chemicals, they have been widely used as fibers, films and other shaped articles. However, the aromatic polyesters are poor in dyeability, so that they have to be dyed under high-temperature, high-pressure conditions or have to be subjected to carrier-dyeing. In addition to such economical and operational drawbacks, they have further disadvantages that they are difficult to be dyed in brilliant colors.

In order to overcome these drawbacks, a method is known from Japanese Patent Publication No. 10497/1959 wherein aromatic polyesters are copolymerized with a compound having acid group such as 5-sodium sulfoisophthalic acid. However, when dyeing this copolymer with a basic dye or disperse dye, in order that it is sufficiently dyed under atmospheric pressure at a temperature about 100° C. and without use of a carrier, it is necessary that 5-sodium sulfoisophthalic acid, for example, should be contained in a quantity more than 5 mol % of the acid components of the polyester. However, such polyesters containing such a large amount of comonomer component having acidic groups are extremely bad in operability in the yarn production step and in addition their hydrolysis resistance is poor, so that it is difficult to employ them for practical use. On the other hand, it is known that copolymerization of polyesters with a high molecular weight polyoxyethylene glycol or its homologue having a molecular weight more than 200 is very effective for improving dyeability and does not greatly decrease the melting point of the polyester obtained. However the disadvantage of this polyester is that its dyed articles are very poor in light-resistance.

As a method to lessen the decrease in light-resistance and to improve dyeability, it is known to copolymerize a straight chain dicarboxylic acid such as adipic acid, cebatic acid, 1,10 -decane dicarboxylic acid, etc.; an aromatic dicarboxylic acid such as isophthalic acid, or an alkyl ester of these acids. It is also known to employ a glycol such as diethylene glycol, 1,4-bis($\beta$-hydroxyethoxy)benzene, bis-ethoxylated 2,2-bis(2,5-dimethyl-4-hydroxyphenyl)propane, neopentyl glycol, cyclohexane dimethanol, etc. copolymerized with 5-sodium sulfoisophthalic acid, etc. In these cases, the improvement effect of dyeability is poor, or if a sufficient dyeability is desired, there is a problem in quality that the melting point of the resulting polyester is remarkably lowered. Further, in the case of the use of a compound, such as neopentyl glycol, diethylene glycol, having a boiling point near that of ethylene glycol, the quantity of distillate during the polycondensation reaction is very large. Therefore, the ratio of the content of the glycol as modifier in the polyester to its charged amount becomes low. In addition thereto, it is difficult to control its content and to purify and reuse the glycol distilled out.

The principal object of this invention, therefore, is to provide new polyesters which have no such drawbacks as pointed out above and which can be dyed deep and clear with disperse dyes or basic dyes under atmospheric pressure at a temperature about 100° C. and without using a carrier.

Thus, the present invention relates to copolyesters formed from dicarboxylic acid components and glycol components characterized in that more than 80 mol % of the dicarboxylic acid components is terephthalic acid or its ester-forming derivative and that more than 80 mol % of the glycol components is a glycol or two or more glycols selected from ethylene glycol, tetramethylene glycol and 1,4-cyclohexane dimethanol and 1 to 10 weight % thereof, based on the resulting polyester, is a glycol represented by the following general formula (I):

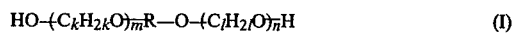

$$HO\text{-}(C_kH_{2k}O)_{\overline{m}}R\text{-}O\text{-}(C_lH_{2l}O)_{\overline{n}}H \qquad (I)$$

wherein R is a divalent aliphatic hydrocarbon group having 4 to 20 carbon atoms, k and l are same or different integers of 2 to 4 , m and n are same or different integers, and $1 \leq m+n \leq 10$.

The present invention also provides a copolyester same as above except that more than 80 mol % of the above-mentioned dicarboxylic acid components is terephthalic acid or its ester-forming derivative and 0.5 to 5.0 mol % is 5-metal sulfoisophthalic acid or its ester-forming derivative.

In the course of the production of the copolyesters of this invention, the glycol represented by the general formula (I) is not substantially distilled out during the polymerization reaction, and therefore the content of the modifier glycol component in the polyester can be controlled to be constant, and products of stabilized quality can be obtained. Also, the dyeability of the polyester obtained is very high and the dyed articles exhibit an excellent light-resistance that has not been obtained when a high molecular weight polyethylene glycol is used as the comonomer. Furthermore, in comparison with the case of using neopentyl glycol or diethylene glycol, there is an advantage that the melting point depression of the polyester is far small.

In the present invention, more than 80 mol % of the dicarboxylic acid components is terephthalic acid or its ester-forming derivative. In a quantity less than 20 mol % of the dicarboxylic acid components and within the range in which the quality of the copolyester is not impaired, it is possible to use as comonomer an aromatic dicarboxylic acid such as 5-metal sulfoisophthalic acid, isophthalic acid, naphthalene dicarboxylic acid, etc. or their ester-forming derivative; an aliphatic dicarboxylic acid such as glutaric acid, adipic acid, azelaic acid, cebatic acid, etc. or their ester-forming derivative; or an oxycarboxylic acid such as p-(2-hydroxyethoxy)benzoic acid, etc. or their ester-forming derivative. Particularly, when 0.5 to 5.0 mol % of 5-metal sulfoisophthalic acid or its ester-forming derivative is used together with terephthalic acid or its ester-forming derivative, the dyeability with basic dyes or disperse dyes is remarkably improved. The metals in 5-metal sulfoisophthalic acid are those that can form a salt with sulfonic acid group and examples of such metals are sodium, potassium, lithium, calcium, barium, lead, lanthanum, etc., and sodium is most typical one. As the ester-forming derivatives of the above-mentioned dicarboxylic acids or oxycarboxylic acids, esters with a lower alcohol such as methanol or ethanol are generally used, but esters with a glycol such as ethylene glycol may also be used.

In the polyesters of the present invention, the glycol components are composed of a glycol or two or more glycols, of which more than 80 mol % is selected from ethylene glycol, tetramethylene glycol and 1,4-cyclohexane dimethanol, and ethylene glycol is most general. Moreover, in the present invention, the glycol represented by the general formula (I) is copolymerized so that the comonomer component of the formula (II):

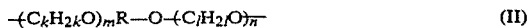
$$-(C_kH_{2k}O)_m R-O-(C_lH_{2l}O)_n-\qquad (II)$$

wherein k, m, l and n are as defined before, is contained in an amount of 1-10 weight % in the resulting copolyester.

As examples of divalent aliphatic hydrocarbon groups represented by R in the above formulae (I) and (II) there may be mentioned straight chain aliphatic hydrocarbon groups such as $-(CH_2)_6-$, $-(CH_2)_{10}-$, etc.; aliphatic hydrocarbon groups having a side chain or side chains such as

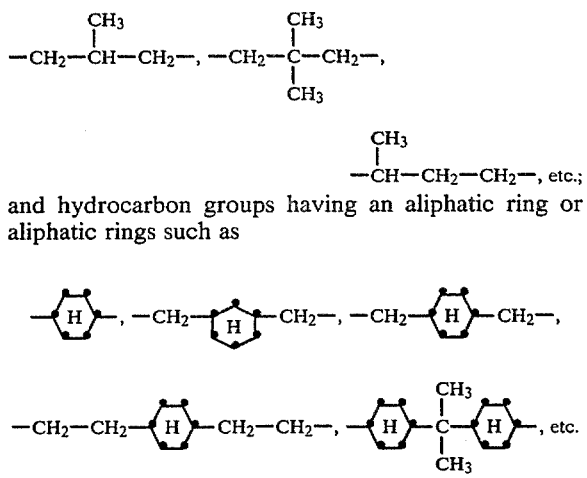

and hydrocarbon groups having an aliphatic ring or aliphatic rings such as

Among them, aliphatic hydrocarbon groups having a side chain or side chains are preferable, and 2,2-dimethyl propylene group represented by

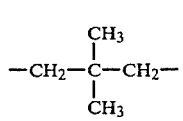

is most preferable.

The glycol represented by the general formula (I) can be prepared by adding alkylene oxide having 2-4 carbon atoms to a glycol of the formula HO—R—OH, wherein R is as defined before, in the usual manner.

Examples of the glycols of the formula (I) are addition product of 1 mol neopentyl glycol with 1-10 mols ethylene oxide, addition product of 1 mol 1,4-butanediol with 1-10 mols ethylene oxide, addition product of 1 mol 1,10-decamethylene glycol with 1-10 mols ethylene oxide, addition product of 1 mol 1,4-cyclohexanedimethanol with 1-10 mols ethylene oxide, addition product of 1 mol 1,4-bis(β-hydroxylethy)cyclohexane with 1-10 mols ethylene oxide, addition product of 1 mol 2,2-bis(4-hydroxycyclohexyl)propane with 1-10 mols ethylene oxide, addition product of 1 mol neopentyl glycol with 1-5 mols propylene oxide and further with 1-5 mols ethylene oxide, addition product of 1 mol 1,4-butanediol with 1-10 mols propylene oxide, addition product of 1 mol 2,2-bis(4-hydroxycyclohexyl)propane with 1-10 mols tetrahydrofurane, etc. They can be used alone or as a mixture of two or more of them. Preferable glycols are those wherein ethylene oxide is added as an alkylene oxide.

In the case of the glycol represented by HO—R—OH which is the case wherein both m and n are 0 in the general formula (I), or in the case of a mixture of modifier glycols having an average value of (m+n) smaller than 1, there are the above-mentioned drawbacks of distilling-out and a defect of melting point depression of the polyester obtained, and therefore it is necessary that (m+n) should be equal or greater than 1. On the other hand, if (m+n) exceeds 10, the dyed articles of the polyester obtained have a remarkably low light-resistance and are not suitable for practical use. The preferable range is $2 \leq (m+n) \leq 8$ and the most preferable range is $3 \leq (m+n) \leq 6$. Within the range in which the effect of the present invention is not impaired, a small quantity of the glycol represented by HO—R—OH or the glycol of the general formula (I) wherein $(m+n) > 10$ may be contained. In addition to the above-mentioned glycol represented by HO—R—OH, a small quantity of the following compounds may be also used within the range in which the effect of the present invention is not impaired: diethylene glycol, triethylene glycol, propylene glycol, 1,4-bis(β2-hydroxyethoxy)benzene, bisphenol A, bis-ethoxylated 2,2-bis(2,5-dimethyl-4-hydroxyphenyl)propane, diphenylsilanol, etc. Also, a branching agent such as pentaerythritol, pyromellitic acid, etc. may also be copolymerized in a quantity in which the moldability of the polyester is not impaired.

In order that the copolyester can exhibit an excellent dyeability, it is preferable that 5-metal sulfoisophthalic acid or its ester-forming derivative is present in a quantity of 0.5 to 5.0 mol % based on the dicarboxylic acid components, and it is necessary that the glycol represented by the general formula (I) should be present as comonomer represented by the general formula (II) in a quantity of 1 to 10 weight % based on the polyester. If these components are present in a quantity less than the each value of the above-mentioned lower limits, the effect of dyeability will become small. On the other hand, if these components are present in a quantity larger than each of the higher limits, there will occur an impairment of operability at the time of shaping such as spinning, or a melting point depression of the polyester, thus lowering the light-resistance and hydrolysis resistance. More preferable quantities of these components are 1.0 to 3.5 mol % based on the dicarboxylic acid components for 5-metal sulfoisophthalic acid or its ester-forming derivative and 2 to 8 weight %, as the comonomer component of the formula (II), based on the polyster for the glycol represented by the general formula (I).

The copolyesters of the present invention can be obtained by the usual processes for producing polyesters, for example, a process comprising ester-exchange reaction of dicarboxylic acid ester with glycol, followed by polycondensation reaction, a process comprising esterification reaction of dicarboxylic acid and glycol, followed by polycondensation reaction, etc. When the process of obtaining the polyester through the esterification reaction is employed, the addition of the glycol represented by the general formula (I) during the time from immediately before the completion of the esterification reaction to the beginning of the polycondensation reaction, is particularly preferable in that the decomposition of the ether linkage is suppressed. When using as the dicarboxylic acid components, terephthalic acid or its ester-forming derivative and 5-metal sulfoisophthalic acid or its ester-forming derivative, these may be reacted at the same time or after these dicarboxylic acid components are reacted separately with the glycol component, the two may be mixed at the polycondensation step.

In order to promote these reactions it is possible to employ a catalyst which may be a compound of such metal as sodium, magnesium, calcium, zinc, manganese, tin, tungsten, germanium, titanium, antimony, etc.

The copolyesters of this invention thus obtained have a melting point, measured by DSC, of 160°–295° C., and an intrinsic viscosity of 0.30 or higher, preferably 0.4 or higher. The upper limit of the intrinsic viscosity is about 2.5 in view of moldability.

There is no limitation on the catalyst used in producing the copolyesters of the present invention or on the additives such as delusterants, stabilizers, etc. The shaping of the polyester obtained is conducted by known methods of forming filaments, films, or other shaped products.

The production of fibers can be conducted in any conventional manner. Thus, for example, the copolyester is subjected to extrusion-spinning at 170°–350° C. and at a take-up speed of 100–6000 m/min. If desired, the unstretched filaments thus obtained may be stretched 1.1–6 times the length.

The polyesters obtained by the process of the present invention and shaped articles produced therefrom have the excellent properties inherent to aromatic polyesters, and are easily dyeable and excellent in lightresistance.

The present invention is explained concretely by the following examples, wherein parts are weight parts.

The quantititve analysis of the glycol components in the polyester was carried out by quantitatively determining the quantity of H atoms by means of NMR. The melting point of the polyester was measured by DSC, for a sample quantity of 10 mg, under a nitrogen atmosphere at a temperature elevation speed of 20° C./min. The intrinsic viscosity was measured at 30° C. in a mixed solution of phenol/tetrachloroethane (6:4 in weight ratio).

The degree of dye exchaustion was determined as follows: as regards disperse dyes, a sample was dyed with 4.0% owf Dispersol Fast Scarlet B (product of I.C.I.; disperse dye), with the addition of 1 g/l Disper TL (product of Meisei Kagaku Kogyo K.K.; dispersant), at a bath ratio of 1:100, at the atmospheric pressure boiling point of 98° C. for 90 minutes; and as regards cationic dyes, a sample was dyed with 5.0% owf Sevron Blue B (product of DuPont), with the addition of 0.2 g/l acetic acid and 0.2 g/l sodium acetate, at a bath ratio of 1:100, at the atmospheric pressure boiling point for 90 minutes; then the light absorbance of each of the dyeing liquids before and after dyeing was measured, and the degree of dye exhaustion was calculated from the following formula:

Degree of dye exhaustion (%) = 100(X−Y)/X wherein X=the light absorbance before dyeing, and Y=the light absorbance after dyeing.

The light-resistance was measured as follows: a sample was dyed with 0.2% owf Resolin Red FB (product of Bayer, disperse dye), with the addition of 1 g/l Disper TL, at a bath ratio of 1:100, at the atmospheric-pressure boiling point, for 60 minutes. After the sample thus dyed was subjected to reduction clearing in the usual way, it was irradiated in a Fade-O-Meter for 40 hours according to the method of JIS-L-0842 so that its color was faded away. The faded color was expressed as a fastness (grade) of Blue Scale Standards.

The hydrolysis resistance was evaluated as follows: a quantity of sample fibers was immersed in pure water (pH 5.7) at a bath ratio of 1:100. After the sample was treated at the atmospheric-pressure boiling point for 4 hours, single-filament break strength (g/d) was measured by means of a Tensilon.

The hydrolysis resistance was expressed as a retention in comparison with the break strength before the treatment.

EXAMPLES 1–7, AND COMPARATIVE EXAMPLES 1–10

One thousand parts of dimethyl terephthalate (DMT), a prescribed quantity of 5-sodium sulfoisophthalic acid dimethyl ester (DSN), a predetermined amount of dimethyl adipate, 700 parts of ethylene glycol (EG) and a prescribed quantity of the glycol of the general formula (I) wherein R is a 2,2-dimethyl propylene group and a varying value of m+n, or a prescribed quantity of a polyethylene glycol (PEG) having a molecular weight of 2,000, were placed in an ester-exchange reactor. To this mixture, 0.38 parts of zinc acetate dihydrate, 0.50 part (when DSN was not added, 0 part) of sodium acetate and 0.33 part of antimony triacetate were added. The ester-exchange reaction was carried out by elevating the temperature from 150° to 210° C. in 130 minutes, while distilling away the by-produced methanol. To this reaction system, 17 parts of a 22% dispersion of titanium dioxide and further 0.8 part of diethyl-2-carboethoxy ethyl phosphonate were added, and the reaction system was maintained for 10 minutes. The resulting product was transferred into a polycondensation tank at 210° C. While the inside temperature was elevated from 210° to 275° C. in 80 minutes, the pressure of the reaction system was gradually reduced to 0.1 mmHg. Thereafter, the polycondensation reaction was conducted for 40 minutes at 275° C. and 0.1 mmHg to obtain a copolyester having a prescribed composition. This copolymer was spun by means of an extrusion spinning machine at a spinning temperature of 290° C. at a winding speed of 900 m/min. The unstretched yarn thus obtained was stretched in the usual way to obtain stretched filaments of 150 deniers/72 filaments. After the filaments were woven into an interlock fabric having a weight of 200 g/m$^2$ and the fabric was scoured, the degree of dye exhaustion, light-resistance and hydrolysis resistance were measured. The results of these measurements, the compositions of the copolyesters and the melting points of the copolyesters are shown in Table 1 together with the intrinsic viscosities.

EXAMPLE 8

A copolyester was obtained in the same way as in Example 3 except that a glycol of the general formula (I) in which R is a decamethylene group and m+n=4, was added in a quantity of 47.4 parts for 1000 parts of DMT. The results are given together in Table 1.

EXAMPLE 9

A copolymer was obtained in the same way as in Example 3 except that a glycol of the general formula (I) wherein R is a group represented by

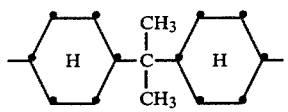

and m+n=4, was added in a quantity of 45.6 parts for 1000 parts of DMT. The results are given together in Table 1.

TABLE 2

| | Glycol (Formula (I)) | Melting point of polyester (°C.) | Intrinsic viscosity | Degree of dye exhaustion (%) (disperse dye) | Light resistance (Grade) |
|---|---|---|---|---|---|
| Comp. Ex. 11 | none | 232 | 1.01 | 58 | 4–5 |
| Ex. 10 | 4 wt. % | 227 | 1.00 | 90 | 4–5 |

TABLE 1

| | Glycol added except EG or m + n of compound (I) | Quantity of the glycol added (parts/1000 parts DMT) | Components in copolyester | | | | Melting point of polyester (°C.) | Intrinsic viscosity | Degree of dye exhaustion (%) | | Light resistance (Grade) | Hydrolysis resistance (%) |
|---|---|---|---|---|---|---|---|---|---|---|---|---|
| | | | Glycol added (wt % based on polyester) | Yield (%) based on charged quantity of added glycol | DSN (mol % based on acid components) | Dimethyl adipate (mol % based on acid components) | | | Disperse dye | Basic dye | | |
| Comparative Ex. 1 | none | 0 | 0 | — | 0 | 0 | 261 | 0.63 | 19 | not dyeable | 5 | 98 |
| Ex. 1 | m + n = 6 | 44.0 | 4.0 | 98 | 0 | 0 | 256 | 0.62 | 67 | not dyeable | 5 | 97 |
| Ex. 2 | m + n = 6 | 65.6 | 5.9 | 99 | 0 | 0 | 254 | 0.63 | 83 | not dyeable | 4–5 | 95 |
| Comp. Ex. 2 | none | 0 | 0 | — | 2.3 | 0 | 256 | 0.47 | 46 | 21 | 4–5 | 80 |
| Comp. Ex. 3 | none | 0 | 0 | — | 6.0 | 0 | 250 | 0.39 | 93 | 99 | 3–4 | 20 |
| Comp. Ex. 4 | PEG | 42.8 | 3.9 | 98 | 2.3 | 0 | 254 | 0.50 | 93 | 99 | 2–3 | 51 |
| Comp. Ex. 5 | m + n = 0 | 30.7 | 3.9 | 61 | 2.3 | 0 | 232 | 0.48 | 82 | 80 | 4–5 | 78 |
| Ex. 3 | m + n = 1 | 45.2 | 3.7 | 93 | 2.3 | 0 | 243 | 0.47 | 88 | 93 | 4–5 | 80 |
| Ex. 4 | m + n = 3 | 46.7 | 3.9 | 98 | 2.3 | 0 | 250 | 0.48 | 93 | 99 | 4–5 | 78 |
| Ex. 5 | m + n = 4 | 45.3 | 4.0 | 100 | 2.3 | 0 | 252 | 0.46 | 94 | 99 | 4–5 | 77 |
| Ex. 6 | m + n = 6 | 45.5 | 3.9 | 98 | 2.3 | 0 | 252 | 0.46 | 94 | 99 | 4 | 77 |
| Ex. 7 | m + n = 10 | 44.9 | 3.9 | 98 | 2.3 | 0 | 254 | 0.48 | 94 | 99 | 3–4 | 69 |
| Comp. Ex. 6 | m + n = 4 | 5.4 | 0.5 | 100 | 2.3 | 0 | 255 | 0.47 | 50 | 28 | 4–5 | 79 |
| Comp. Ex. 7 | m + n = 4 | 169.7 | 14.7 | 98 | 2.3 | 0 | 230 | 0.47 | 95 | 100 | 2–3 | 40 |
| Comp. Ex. 8 | m + n = 12 | 43.6 | 4.0 | 100 | 2.3 | 0 | 254 | 0.48 | 93 | 99 | 2–3 | 59 |
| Ex. 8 | m + n = 4 | 47.4 | 4.0 | 100 | 2.3 | 0 | 253 | 0.46 | 91 | 96 | 4–5 | 78 |
| Ex. 9 | m + n = 4 | 45.6 | 4.0 | 100 | 2.3 | 0 | 253 | 0.47 | 94 | 99 | 4–5 | 77 |
| Comp. Ex. 9 | none | 0 | 0 | — | 2.3 | 2 | 244 | 0.48 | 61 | 67 | 4–5 | 81 |
| Comp. Ex. 10 | none | 0 | 0 | — | 2.3 | 5 | 232 | 0.46 | 86 | 93 | 4 | 77 |

It will be understood from Table 1 that the copolyesters of the present invention are less in melting point depression, excellent in dyeability and good in light-resistance and in hydrolysis resistance.

EXAMPLE 10 AND COMPARATIVE EXAMPLE 11

1000 parts of DMT, 695 parts of 1,4-butanediol, 50.5 parts (4.0% by weight based on produced polyester) of a glycol of the formula (I) wherein R is 2,2-dimethylpropylene and m+n is 4 and 0.9 part of tetrabutyl titanate were charged into an ester-exchange reactor and the mixture was heated to 150°–210° C. in 130 minutes to effect the ester-exchange reaction. The product was transferred to a polycondensation reactor and while increasing the interior temperature to 210°–255° C. in 80 minutes, the pressure of the reaction system was gradually reduced to 0.1 mmHg, and then the polycondensation reaction was conducted at 255° C., 0.1 mmHg for 60 minutes to obtain copolyester.

This polyester was subjected to extrusion-spinning by the same spinning machine as in Example 1 at 260° C. and take-up speed of 900 m/min. Then an interlock fabric was prepared in the same manner as in Example 1 and the degree of dye exhaustion and light-resistance were measured. The results are shown in Table 2.

What we claim is:

1. Copolyester formed from dicarboxylic acid components and glycol components characterized in that more than 80 mol % of the dicarboxylic acid components is terephthalic acid or its ester-forming derivative, and that more than 80 mol % of the glycol components is a glycol or two or more glycols selected from ethylene glycol, tetramethylene glycol and 1,4-cyclohexane dimethanol and 1 to 10 weight % thereof, based on the resulting polyester is a glycol represented by the following formula (I):

wherein R is a divalent aliphatic hydrocarbon group having 4 to 20 carbon atoms, m and n are same or different integers, and wherein $3 \leq m+n \leq 10$.

2. A copolyester as claimed in claim 1 wherein more than 80 mol % of the above-mentioned dicarboxylic acid components is terephthalic acid or its ester-forming derivative and 0.5 to 5.0 mol % is 5-metal sulfoisophthalic acid or its ester-forming derivative.

3. A copolyester according to claim 1 wherein R in the formula (I) is an aliphatic hydrocarbon radical having a side chain or side chains.

4. A copolyester according to claim 1 wherein the glycol of the formula (I) is one wherein $3 \leq m+n \leq 6$.

5. A fiber formed from a copolyester according to any of claims 1, 2, 3 or 4.

* * * * *